(12) United States Patent
Agarwal et al.

(10) Patent No.: US 8,788,473 B2
(45) Date of Patent: *Jul. 22, 2014

(54) MATCHING TRANSACTIONS IN MULTI-LEVEL RECORDS

(71) Applicant: International Business Machines Corporation, Armonk, NY (US)

(72) Inventors: Manoj K. Agarwal, Noida (IN); Curt L. Cotner, Gilroy, CA (US); Amitava Kundu, Bangalore (IN); Prasan Roy, Bangalore (IN); Rajesh Samabandhan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/906,374

(22) Filed: May 31, 2013

(65) Prior Publication Data

US 2013/0325829 A1    Dec. 5, 2013

Related U.S. Application Data

(63) Continuation of application No. 13/483,778, filed on May 30, 2012.

(51) Int. Cl.
*G06F 17/30* (2006.01)

(52) U.S. Cl.
USPC .......................................................... 707/703

(58) Field of Classification Search
CPC ..................... G06F 17/30008; G06F 17/30371
USPC .......................................................... 707/703
See application file for complete search history.

(56) References Cited

U.S. PATENT DOCUMENTS

| | | | |
|---|---|---|---|
| 7,110,540 B2 | 9/2006 | Rajagopal et al. | |
| 7,508,985 B2 | 3/2009 | Van Lunteren | |
| 7,548,652 B1 | 6/2009 | Ahrens | |
| 7,613,701 B2 | 11/2009 | Zhao et al. | |
| 2009/0125514 A1 | 5/2009 | Brown | |
| 2009/0182728 A1* | 7/2009 | Anderson | 707/5 |

OTHER PUBLICATIONS

Cohen, W. et al. "A Comparison of String Metrics for Matching Names and Records". KDD workshop on data cleaning and object consolidation, 2003. Copyright 2003, American Association for Artificial Intelligence (www.aaai.org).

(Continued)

*Primary Examiner* — Joshua Bullock
(74) *Attorney, Agent, or Firm* — David Zwick; Mohammed Kashef

(57) ABSTRACT

A method for identifying matching transactions between two log files where each transaction includes one or more statements. Each log file record records the execution of a statement and includes a transaction identifier. Each record in turn in one log file is compared to an advancing window of records in the other log file. A first table contains associations of statements to transactions and transactions to statements for records in the window. If a match is found between a record in the one file and a record in the window, information associating partial transactions in the one file to potential transactions of the records in the window is added to a second table. If an end-of-transaction record is read from the one file, a best match is found between the ended transaction and the potential transactions based on information in the first and second tables.

6 Claims, 12 Drawing Sheets

(56) References Cited

OTHER PUBLICATIONS

"Sequence alignment—Wikipedia, the free encyclopedia". [online] Published on: Aug. 17, 2011. Retrieved from the internet: <URL:http://en.wikipedia.org/w/index.php?title=Sequence_alignment&oldid=445313651>.

"String searching algorithm—Wikipedia, the free encyclopedia". [online] Published on: Aug. 7, 2010. Retrieved from the internet:<URL:http://en.wikipedia.org/w/index.php?title=String_searching_algorithm&oldid=377654557>.

Agarwal, M. et al., U.S. Appl. No. 13/483,778, filed May 30, 2012.

* cited by examiner

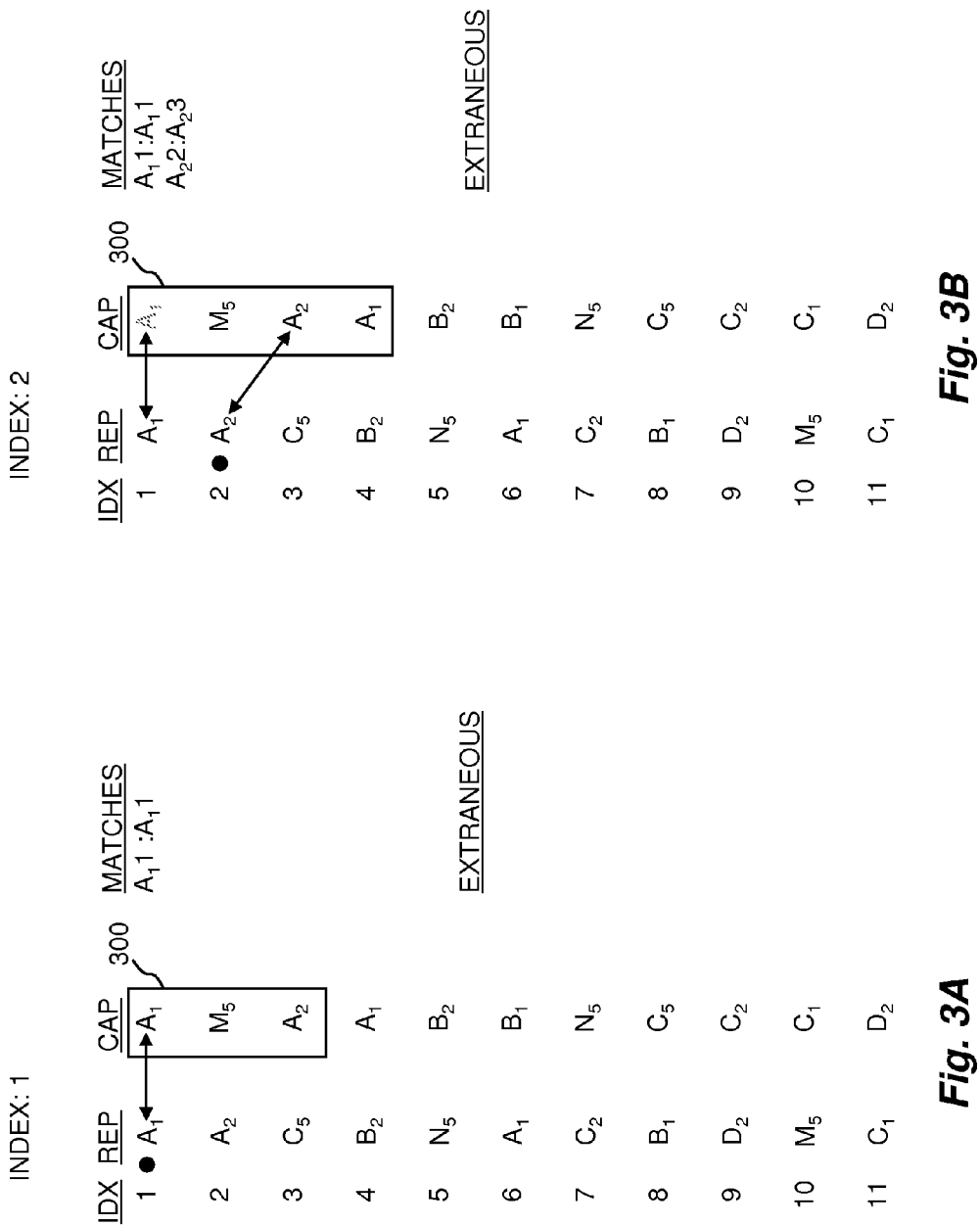

MATCHING TRANSACTIONS IN MULTI-LEVEL RECORDS

CROSS-REFERENCE TO RELATED APPLICATIONS

This application is a continuation of U.S. patent application Ser. No. 13/483,778 filed on May 30, 2012, the entire content and disclosure of which is incorporated herein by reference.

FIELD OF THE INVENTION

The present invention relates generally to pattern matching between sequences of transactions, and more particularly to multi-character elements in which the elements are interleaved differently in each sequence.

BACKGROUND

Databases are routinely upgraded to new versions, or new software patches are applied on existing versions, or the database is migrated to a new database system. In each of these situations, it is typical to compare the performance of a benchmark transaction workload in the new database environment as compared to the old database environment. A benchmark transaction workload is a sequence of different transaction types. In a typical database environment, each transaction can be a sequence of one or more Structured Query Language (SQL) statements. To compare the performances of the benchmark transaction workloads, corresponding instances of transactions in the new and old database environments are matched. Matching and comparing corresponding transactions is necessary because there will typically be workloads occurring in the database environments that are extraneous to the benchmark workloads, and performance of the same transaction type varies during the workload execution since the underlying data is continuously modulated. The benchmark transaction workload comparison typically involves comparing the transaction logs of the old and new database environments.

A simple form of matching involves identifying the occurrences of a short character string inside a longer character string. A simple approach to this problem is advancing the shorter string through the longer string one character at a time, and determining if there is a match between the shorter string and the corresponding characters of the longer string. If there is not a match, the shorter string is advanced by one character in the longer string.

Another well-known matching problem involves sequence alignment. This problem is perhaps best known in the context of DNA matching. A full DNA sequence can be characterized as a series of shorter four-character sequences, where each character of the a shorter sequence can be one of A, C, G, or T, representing different nucleotide bases. Various techniques have been developed to determine the alignment of two DNA sequences that will give the highest level of correspondence between the two sequences.

Neither of these known matching solutions address matching transactions in the more complicated environment usually found associated with databases.

SUMMARY

Embodiments of the present invention provide a system, method, and program product for identifying matching transactions between two log files. Each transaction includes one or more programming statements, each programming statement includes one or more tokens and an indicator indicating if the programming statement is the end-of-transaction programming statement of the transaction, each log file contains records recording the execution on a computer of the programming statements, each record includes a transaction identifier, the tokens, and the end-of-transaction indicator indicating if the record is the end-of-transaction record of the transaction of the corresponding executed programming statement. A computer, in response to determining that a least recently read record of a fixed number of sequentially read records from a first log file is not associated with an indication of match, removes references to the transaction identifier and the programming statement associated with the least recently read record from a first table that includes associations of programming statements to the transaction identifiers to which they are associated, and associations of transaction identifiers to their associated programming statements. The computer, in response to determining that the least recently read record is an end-of-transaction record, removes references to the transaction identifier associated with the record from the first table. The computer reads a next sequential record from the first log file into the fixed number of sequentially read records. The computer adds information to the first table, based on the transaction identifier and the programming statement information contained in the next sequential record read from the first log file, associating the programming statement to the transaction identifier, and associating the transaction identifier to the programming statement. The computer reads from a second log file the record at a position in the second log file a defined fixed offset of records away from the position in the second log file corresponding to the position in the first log file of the next sequential record read from the first log file. The computer determines if the record read from the second log file matches a record in the fixed number of sequentially read records. The computer, in response to determining that the record read from the second log file matches a record in the fixed number of sequentially read records, adds information to a second table that contains associations of transaction identifiers contained in records read from the second log file to transaction identifiers contained in records read from the first log file, based on information contained in the first table. The computer, in response to determining that the record read from the second log file does not match a record in the fixed number of sequentially read records, removes references to the transaction identifier contained in the record read from the second log file from the second table. The computer, in response to determining that the record read from the second log file matches a record in the fixed number of sequentially read records and that the record read from the second log file is an end-of-transaction record, identifies a transaction from the first log file that matches a transaction from the second log file based on information contained in the second table.

BRIEF DESCRIPTION OF THE SEVERAL VIEWS OF THE DRAWINGS

FIGS. 3A to 3E visually illustrate the operation of several successive iterations of the simplified SQL record matching algorithm in FIG. 2, in accordance with an embodiment of the present invention.

DETAILED DESCRIPTION

Embodiments of the invention are directed to heuristic approaches for identifying matching transactions between two transaction log files containing sequences of SQL records, where each transaction includes one or more SQL records. In embodiments of the invention, the first transaction log file is called the "capture" file, and the second transaction log file is called the "replay" file. The heuristic algorithms of the present invention advance down the replay file one record at a time and attempt to find matching records and transactions in the capture file.

Certain assumptions are made with respect to the SQL records in the transaction log files. These assumptions are typically true for records in a transaction log file. The heuristic algorithms and the various assumptions of the invention may result in a small fraction of matches not being identified. However, there will typically be enough actual matches identified such that the missed matches are relatively insignificant.

Embodiments of the present invention will now be described in detail with reference to the accompanying drawings.

Figure 1:
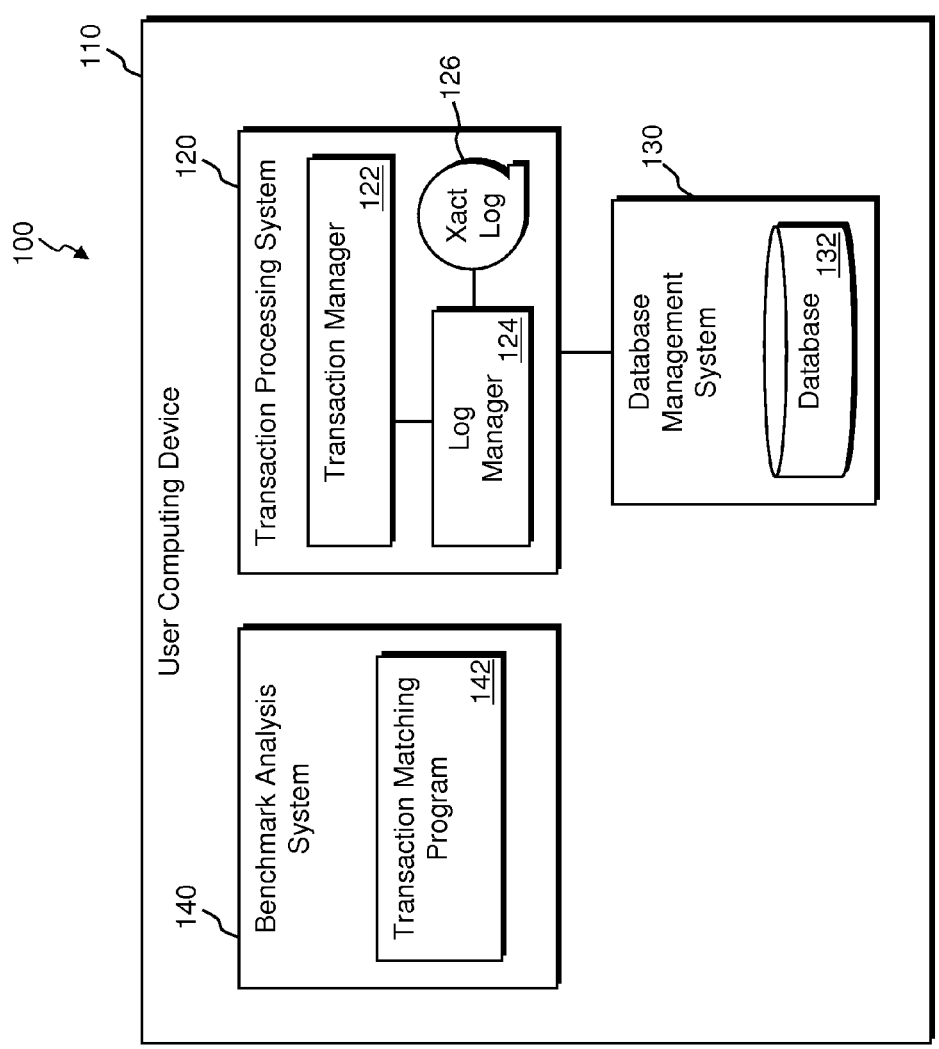
FIG. 1 is a functional block diagram of a transaction matching system in accordance with an embodiment of the present invention.

FIG. 1 is a functional block diagram illustrating a transaction matching system 100 in accordance with an embodiment of the present invention. Transaction matching system 100 includes user computing device 110, which further includes transaction processing system 120, database management system 130, and benchmark analysis system 140.

In preferred embodiments of the invention, user computing device 110 can be, for example, a mainframe or mini computer, a laptop, or netbook personal computer (PC), or a desktop computer. Transaction matching system 100 is shown as being wholly implemented on user computing device 110. However, transaction matching system 100 may operate in a distributed environment in which one or more of its components are implemented across a plurality of computing devices that communicate over a network, such as a local area network (LAN) or a wide area network (WAN) such as the Internet. For example, benchmark analysis system 140 may operate on a separate computing device having sufficient capabilities to support only the operation of benchmark analysis system 140. In general, transaction matching system 100 can execute on any computing device 110, or combination of computing devices, satisfying desired implementation requirements, and as described in relation to FIG. 6.

Transaction processing system 120 includes transaction manager 122, log manager 124, and transaction log file 126. Transaction manager 122 manages the processes that execute transactions against database 132 via database management system 130. Transaction manager 122 also manages all transactions so as to maintain data consistency in database 132. This is accomplished through the use of log manager 124. Log manager 124, among its other activities, records each transaction operation of a transaction workload, such as the execution of SQL statements in a transaction, in a SQL record to a transaction log file 126.

Figure 6:
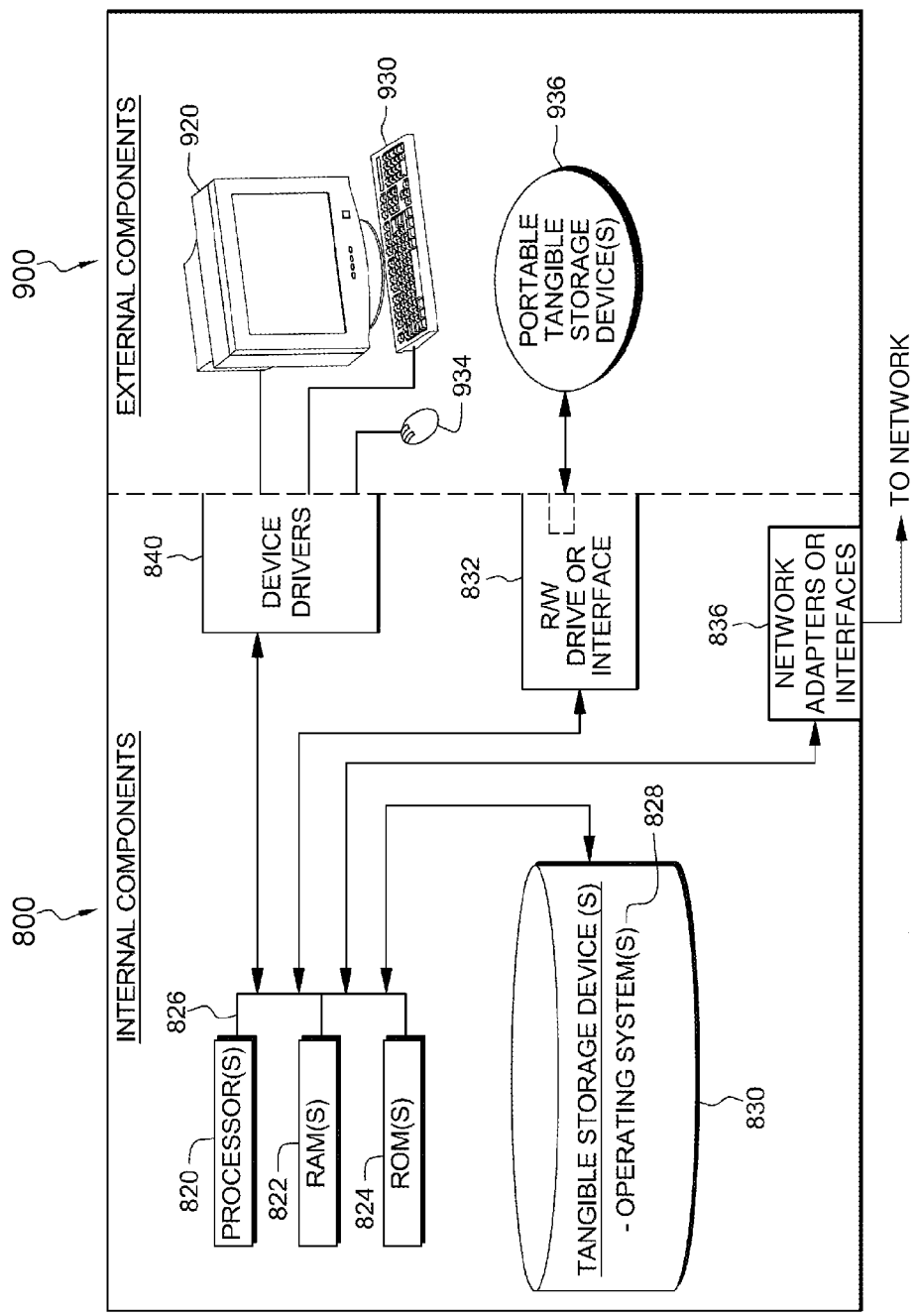
FIG. 6 is a block diagram of hardware and software within the user computing device of FIG. 1, in accordance with an embodiment of the present invention.

Database management system 130 includes database 132, which may reside, for example, on tangible storage device 830 (see FIG. 6). Database management system 130 manages access to database 132, and manages the resources associated with database 132, such as disk space.

Benchmark analysis system 140 operates generally to analyze different executions of a benchmark transaction workload, and provide systems and applications programmers and systems administrators information to determine, for example, the most efficient organization of a database 132, or of a transaction workload, or for determining the most efficient database management system 130 or transaction processing system 120. The information that benchmark analysis system 140 processes is derived from transaction log file 126. For example, the transaction log file 126 information pertaining to two different executions of a benchmark transaction workload are stored on disk, such as tangible storage device 830, after each benchmark workload completes, and this information is made available to benchmark analysis system 140 for analysis.

Benchmark analysis system 140 includes transaction matching program 142, which is the focus of the present invention. Transaction matching program 142, the operation of which will be described in more detail below, operates generally to identify matching transactions between different executions of a benchmark transaction workload. These matching transactions are then analyzed by benchmark analysis system 140 to provide the information stated above.

Embodiments of the invention are described with respect to the components and their functionality as presented in FIG. 1. Other embodiments of the invention may perform the invention as claimed with different functional boundaries between components. For example, the functionality of transaction matching program 142 may be implemented as a standalone component, or as a function of transaction processing system 120.

Although the same benchmark transaction workload may be executed twice in the same database environment, the transaction log files 126 of these executions may be different for several reasons. For example, otherwise matching SQL statement clauses that include current date or time host variables may produce different log records. There may also be other workloads executing on the database systems that produce extraneous log records that will be intermixed in the transaction log file 126 with the benchmark transaction workload records. In addition, SQL records for a given transaction may appear in different orders in different log files. If the transaction workload is executed on different database systems, the transaction file 126 log records may reflect that various system variables may have different names between the two database systems.

Because of these and other differences between the transaction log files 126, the heuristic approaches of embodiments of the invention use various assumptions. For example, one assumption is that a record in the replay file will find a match in the capture file, if there is a match, within a certain range or "match window". This assumption serves to recognize that records can be out of order between the capture and replay files, and that there may be extraneous records in the replay file for which there is no matching record in the capture file. The assumption also serves to limit, or bound, the number of compare operations and thus limit the computer resources consumed by the compares. The trade-off for this assumption is that if there is a capture record outside of the match window that does match the current replay record, this match will not be found and the replay record will be flagged as extraneous. This and other assumptions will be discussed in more detail below.

A benchmark transaction workload typically includes a sequence of database transactions. Each database transaction will typically comprise a sequence of multiple SQL statements. When a series of database transactions are executed, for example, by transaction processing system 120, the SQL statements of a transaction are typically executing in an interleaved manner with the SQL statements of other database transactions of the benchmark transaction workload. Thus, although the database transactions may execute in sequence, their underlying SQL statements can be interleaved with SQL statements of other transactions, and the corresponding transaction log file 126 records will be similarly interleaved. Further, different executions of the same benchmark transaction workload can produce different execution sequences of the underlying SQL transactions. This could be due to such factors as I/O scheduling by the operating system, I/O delay, network delay, locking and latching within the database, etc. Although the execution of the underlying SQL statements of different transactions may be interleaved, the SQL statements in a given transaction will execute in order, and will appear in the transaction log file 126 in order.

SQL statements belonging to a database transaction might also be changed when executed in different database environments. This could result, for example, from the way certain database environments optimize SQL statements prior to execution. In embodiments of the invention, another assumption is made that, with regard to a changed SQL statement, each occurrence of the changed statement will be the same. For example, if database environment optimizes a certain SQL statement, then every occurrence of the SQL statement will be optimized in the same way. In certain embodiments, if a changed SQL statement in the replay file can at least be partially matched to its corresponding SQL statement in the capture file, and this partial match occurs a certain number of times, this correspondence is recorded and subsequent occurrences of the changed SQL statement are automatically changed to the unchanged version of the SQL statement, thus reducing the resources associated with processing partial SQL statement matches.

A benchmark transaction log file 126 may also contain extraneous SQL records. These are records in the capture and replay files that cannot be matched to records in the other file. Extraneous records may result from transactions executing in a database environment that are not part of the benchmark transaction workload.

As mentioned above, the same SQL statement executed at different times in the same database environment, or different database environments, can produce different transaction log file 126 records. In embodiments of the invention, these different log records can be identified as partial matches, and, depending on how close the match is, can be considered as matches.

With respect to SQL statement matching, each SQL statement is considered an ordered sequence of tokens. SQL record in the transaction log files 126 are compared token by token rather than comparing SQL record as complete character strings. A SQL token is a word or character that can be identified meaningfully when the SQL statement is parsed, or interpreted. For example, each token can typically be considered a keyword, an identifier, a quoted identifier, a constant, or one of several special character symbols. SQL statement clauses can include several tokens. Token by token comparisons allow for meaningful determinations of partial matches, and identifications of complete matches, even though not all corresponding token values are identical. For example, there might be some differences in the host variables between log files. If the only difference between two SQL record is differences in the host variables, this could be considered a high-scoring partial match. In preferred embodiments of the invention, tokens matching is done in a Boolean manner, i.e., either a pair of corresponding tokens match exactly or they don't match at all. For instance, there is no partial matching between two tables named "Order" and "Orders". This token based string comparison also helps to remove the differences that arise due to change in comments, change in schema name, etc. For example, comments can be ignored or stripped from the record during the compare step.

An assumption with regard to SQL record matching is that if a replay SQL record partially matches a capture SQL record, and the SQL record includes multiple host variables, then at least one of the host variables in the matching records should match. This assumption is one way to increase the likelihood that a partial match between a replay transaction and a capture transaction with a match score above the match score threshold is in fact an actual match. If the potentially matching records do not have a common host variable, then a mismatch is declared.

In preferred embodiments of the invention, the similarity between two SQL records is determined by assigning a numerical value to a match score. For example, if all tokens of a SQL record match those of another, the match score is 1. If no tokens match, the match score is 0. If the first token, which will typically be the statement or command type, doesn't match, then the entire record may be considered as not matching. A partial match score can be based, for example, on the percentage of tokens that match. If most tokens match, except for host variable tokens, a percentage increase may be added to the match score. In preferred embodiments a match score threshold is defined, below which a mismatch is declared. For example, a match threshold of 80% may be defined. Because a transaction workload often involves repeating sequences of transactions, it is possible that a replay file record may partially match more than one capture file records with a match score above the mismatch threshold.

As mentioned above, embodiments of the invention use a match window as an assumption to limit the number of records that are compared in the capture file to a replay file record. The capture file match window is expressed as a 2K+1 window, where K is the number of records searched before and after the capture file record that corresponds to the replay record that is being matched. For example, if capture records having log file index locations 80 to 120 are searched for a match to a replay record at log file index location 100, K equals 20 and the match window is 41 records. Generally, embodiments of the invention step down the replay file one record at a time, and search the corresponding match window in the capture file for matching records. If a matching capture file record is not found in the match window, the replay record is marked as extraneous. If the match window advances beyond a capture file record that has not been matched, the capture file record is considered extraneous. In certain embodiments of the invention, the match window is not centered on the corresponding record number of the record being read in the replay file, but is a fixed offset number of records away. The match window can be implemented, for example, as a circular buffer with a length of 2K+1.

The number of records in the match window is typically based on an input to the algorithm, for example 501 records, and can be based on such considerations as the number of extraneous records in a log file, and actual statistics related to distance between matching records. The window size can be adjusted to accommodate performance and accuracy considerations.

Figure 2:
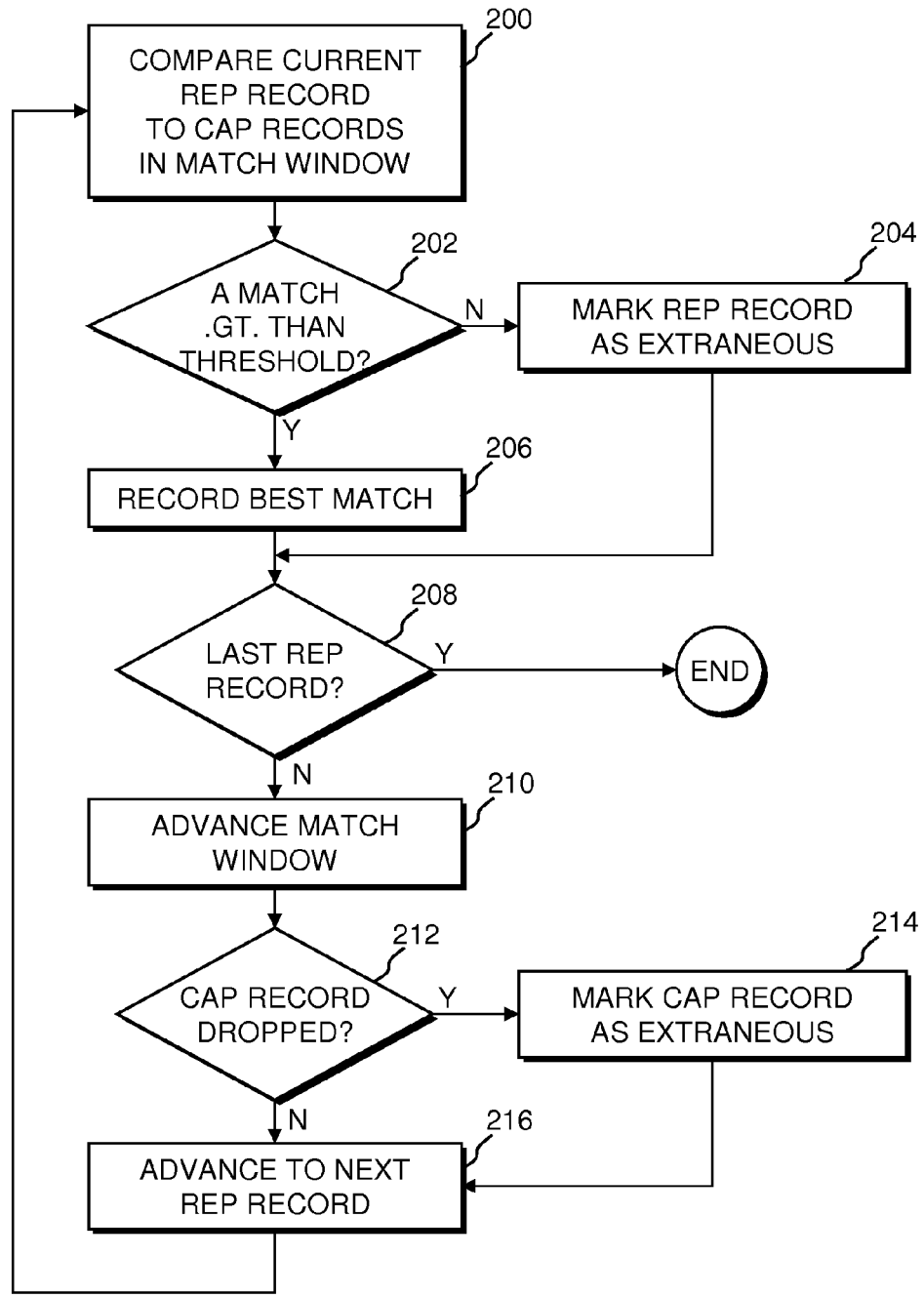
FIG. 2 is a flowchart depicting the steps of a simplified SQL record matching algorithm encompassing several key aspects of the operation of the transaction matching program of FIG. 1, in accordance with an embodiment of the present invention.

FIG. 2 is a flowchart depicting the steps for a simplified SQL record matching algorithm encompassing several key aspects of the operation of transaction matching program 142 associated with SQL record matching. FIGS. 3A to 3E visually illustrate several successive iterations of the simplified SQL record matching algorithm of FIG. 2. Although the simplified SQL record matching algorithm described here is not the full transaction matching algorithm executed by transaction matching program 142 in embodiments of the invention, describing the simplified algorithm allows for an easier explanation of the transaction matching algorithm executed by transaction matching program 142 in embodiments of the invention. In particular, the simplified algorithm does not encompass the transaction matching aspects of embodiments of the invention. Aspects of embodiments of the present invention dealing with transaction matching will be explained in detail below.

FIGS. 3A to 3E all include a column labeled "IDX" which represents the index number of records in the capture and replay files. The column labeled "REP" represents a set of records in the replay file. The column labeled "CAP" represents a set of records in the capture file. Window 300 represents the capture file match window. In this example, K equals 2, and the full match window size is five capture records.

Both the replay records and the capture records as illustrated include the underlying SQL statements for the following two transactions:

T1: $A_1 A_1 B_1 C_1$
T2: $A_2 B_2 C_2 D_2$

As illustrated, the underlying SQL statements of the two transactions are interleaved in both the replay and capture files. In addition, both the replay and capture files contain some extraneous SQL records from other transactions.

FIG. 3A shows aspects of the SQL record matching algorithm for a replay record 1. Match window 300 includes capture records 1-3. In this case, the match window is not the full five records because the algorithm is beginning with the first records in each file. Replay record 1 is compared with the capture records in match window 300 (step 200). In this example, when the token-by-token comparison is done between replay record $A_1$ at position 1 and the three capture records in match window 300, capture record $A_1$ at position 1 and record $A_2$ at position 3 have match scores greater than the match score threshold (decision step 202, "yes" branch). Capture record $M_5$ at position 3 is from a different transaction, and further, is a different SQL record, and thus will have a match score less than the match score threshold value.

In this example, capture record $A_1$ at position 1 has a better match score than record $A_2$ at position 3, because record $A_2$ is from a different transaction, and the match between replay record $A_1$ at position 1 and capture record $A_1$ at position 1 is recorded (step 206), as indicated in FIG. 3A, under the "Matches" heading.

FIG. 3B shows aspects of the SQL record matching algorithm for replay record 2. As illustrated, the previous replay record at position 1 was not the last replay record (decision step 208, "no" branch), and the example algorithm has advanced the match window 300 (step 210), which now includes capture records 1 to 4. Similar to the case illustrated by FIG. 3A, the match window 300 does not include the full five records. Because capture record $A_1$ at position 1 was declared a match, this record will not be compared with further replay records. Also, because no unmatched capture records have been dropped from match window 300 (step 212, "no" branch), no capture records will be marked as extraneous (step 214), and the example algorithm advances to the next replay record (step 216), which, in this case, is record $A_2$ at position 2. In this case, similar to the case illustrated in FIG. 3A, a match is recorded between replay record $A_2$ at position 2 and capture record $A_2$ at position 3.

Figures 3C, 3D:
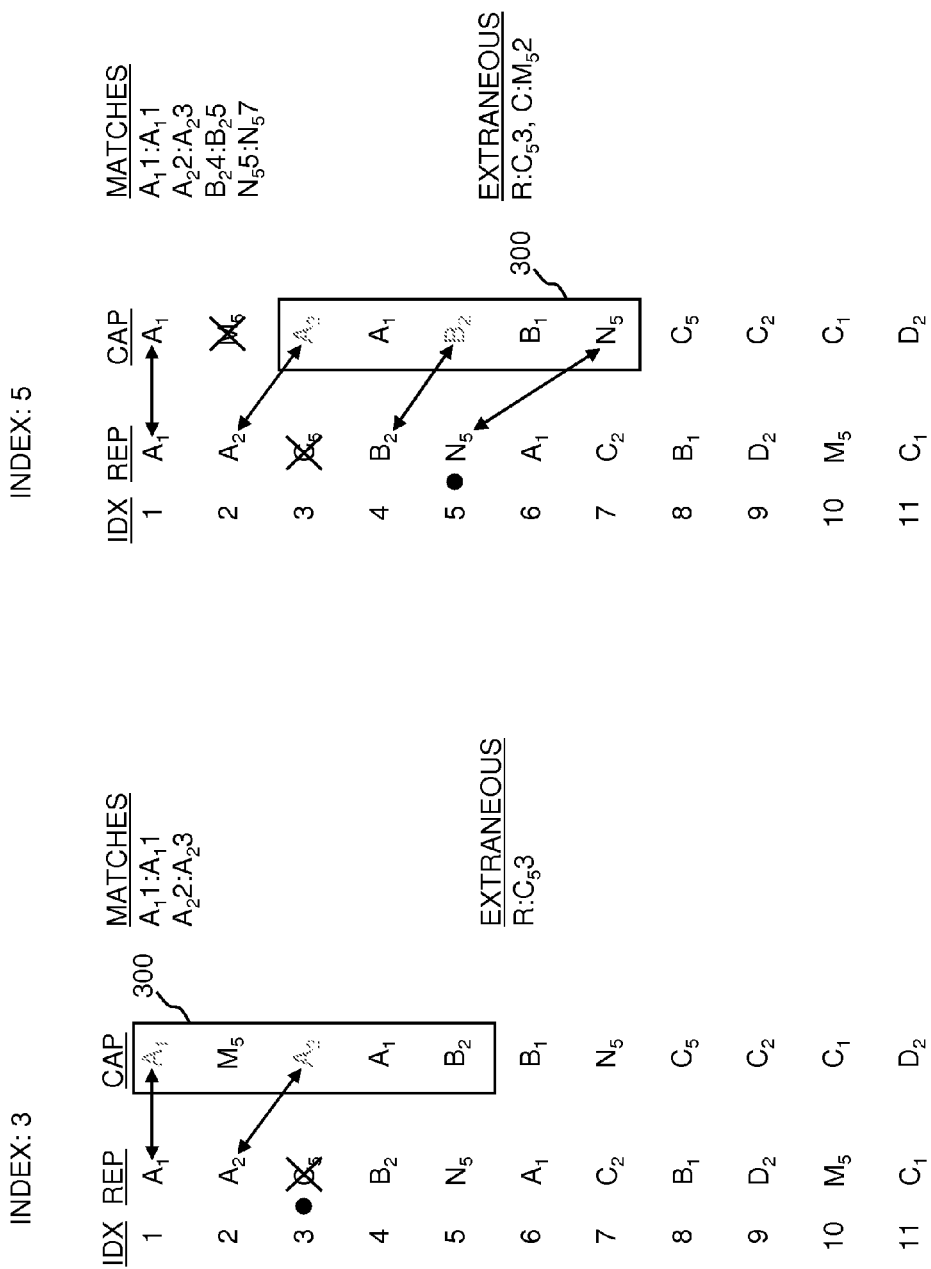

FIG. 3C shows aspects of the SQL record matching algorithm for replay record 3. As illustrated, the example algorithm has advanced the match window 300 (step 210), which now includes capture records 1 to 5, which reflects the full five record match window. The algorithm has also advanced to the next replay file record $C_5$ at position 3 (step 216). In this case, all capture file records in match window 300 have a match score less than the match threshold value (decision step 202, "no" branch) and replay record $C_5$ at position 3 is marked as extraneous (step 204), as indicated in FIG. 3C by the "X" through the record, and the entry under the "Extraneous" heading.

FIG. 3D shows aspects of the SQL record matching algorithm for replay record 5.

This case illustrates that match window 300 has advanced to be centered at capture file position 5 (step 210), and capture file record $M_5$ at position 2 is dropped from match window 300 (step 212, "yes" branch) before it was matched with any replay records. As a result, capture file record $M_5$ at position 2 has been marked as extraneous (step 214). As illustrated, it appears that replay record $M_5$ at position 10 may have matched capture file record $M_5$ at position 2. However, because the match window is five records, these two records will not be compared to each other.

In this case, a match is recorded between replay record $N_5$ at position 5, and capture record $N_5$ at position 7. This match is shown for consistency in the algorithm as illustrated. In operation, embodiments of the invention also include an advancing window for transactions. If the current replay record being compared cannot be a SQL record in any of the transactions in the transaction window, the record would be marked as extraneous. This will be explained more fully below.

Figure 3E:
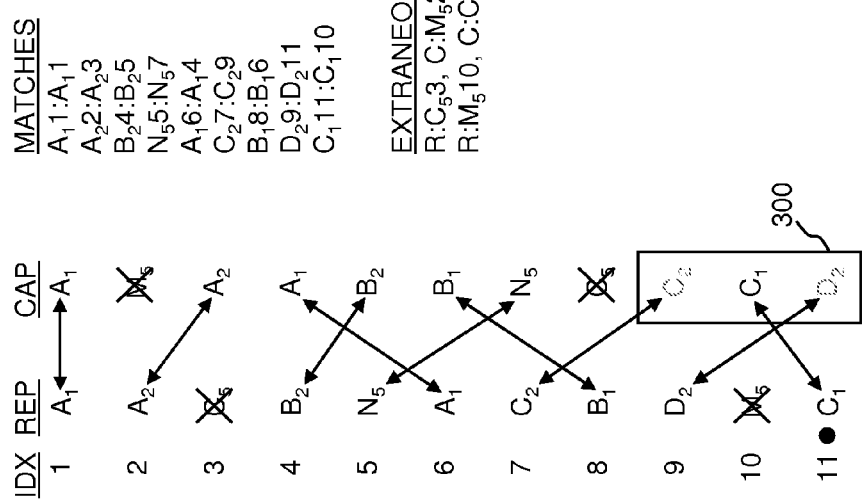

FIG. 3E shows aspects of the SQL record matching algorithm for replay record 11. FIG. 3E indicates how all replay records would be processed by the example algorithm. Because replay record $C_1$ at position 11 is the last replay record (decision step 208, "yes" branch), the algorithm will end.

Figure 4A:
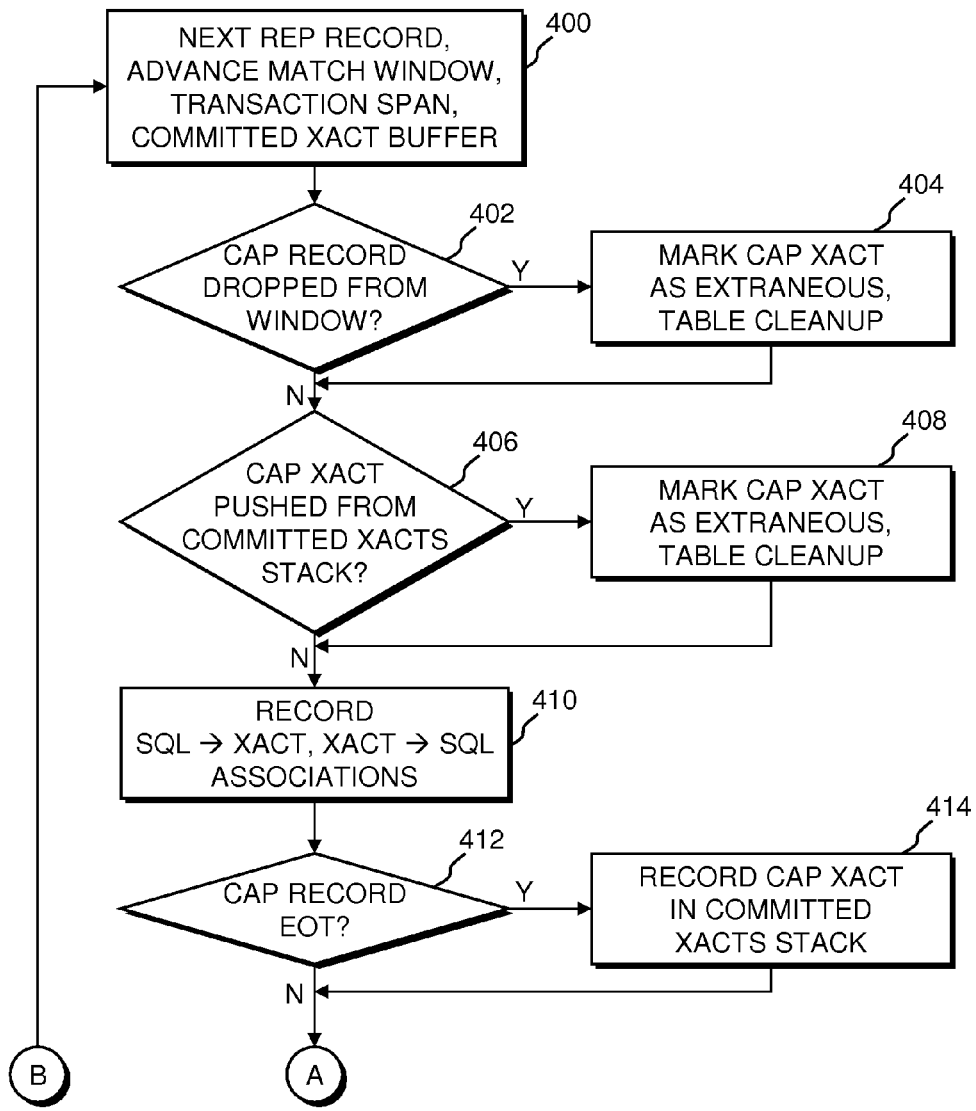
FIGS. 4A and 4B are a flowchart depicting the steps of the transaction matching program of FIG. 1, in accordance with an embodiment of the present invention.
Figure 4B:
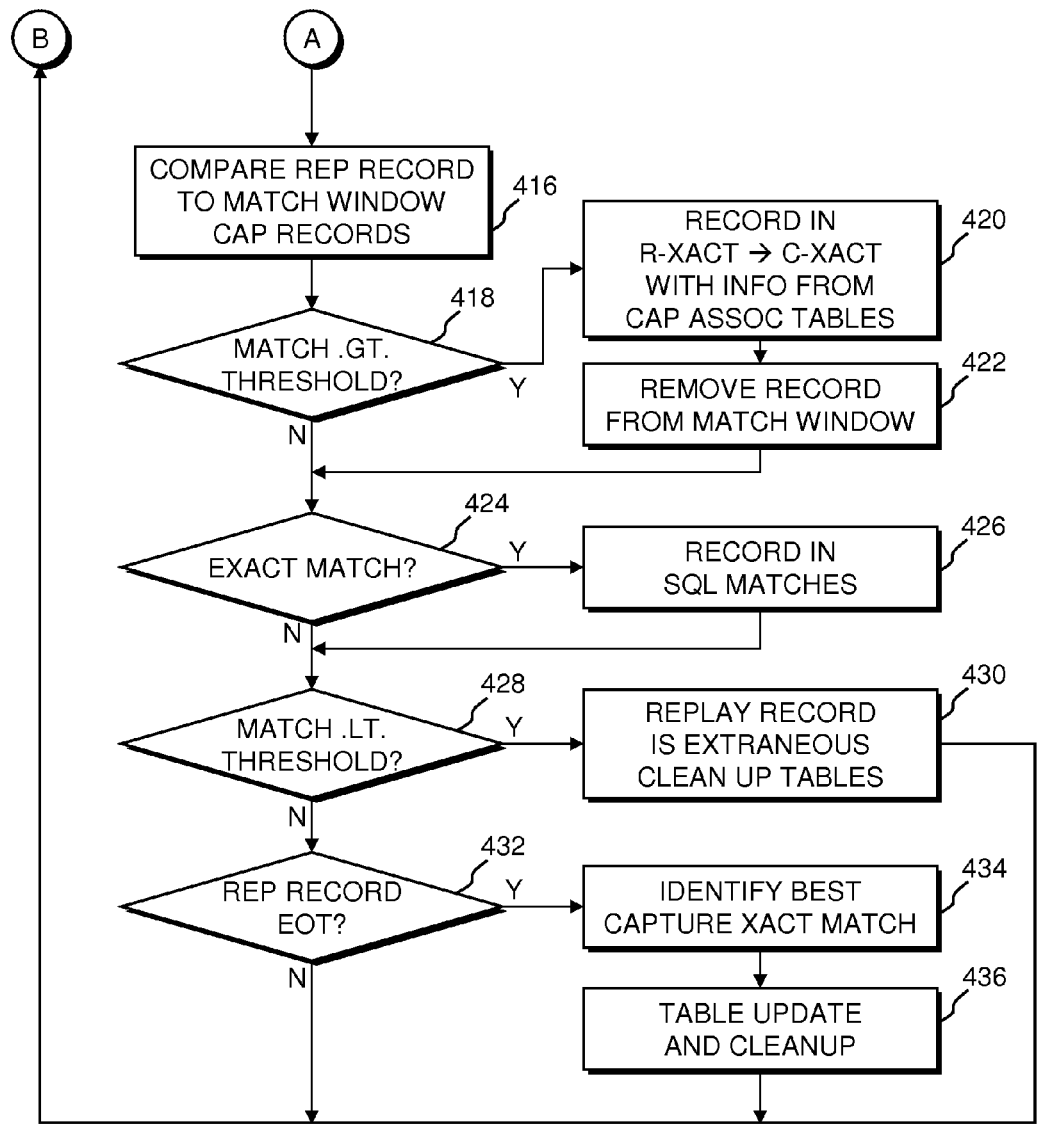

FIGS. 4A and 4B are a flowchart depicting the steps of transaction matching program 142 of FIG. 1, in accordance with an embodiment of the present invention. FIGS. 5A to 5D visually illustrate the operation of several successive iterations of transaction matching program 142, as described with relation to the flowchart of FIGS. 4A and 4B, in accordance with an embodiment of the present invention.

With respect to transaction matching generally, a capture transaction will match a replay transaction if all the SQL record of the capture transaction match all the SQL record of the replay transaction. However, as stated above, partial matching of SQL records are possible. Thus, if a replay transaction has more than one potential matching capture transactions, the capture transaction with the highest match score is considered the best match. For example, the capture transaction having the greatest sum of SQL record match scores with relation to a specific replay transaction is considered the best candidate for a transaction match.

An assumption with regard to transaction matching is that at least one of the underlying SQL statements of a replay transaction will have an exact match with the corresponding SQL statement of a potentially matching capture statement. This assumption is one way to increase the likelihood that a declared match between a replay transaction and a capture transaction is in fact an actual match. These exact SQL record matches are recorded in an exact match table, and can be used to improve the likelihood of identifying an actual matching transaction from the potential matching transactions in replay table XACT→C-XACT. For example, replay table R-XACT→C-XACT may indicate that a replay transaction has more than one potentially matching capture transactions after the end-of-transaction record for the replay transaction has been read. If one or more potentially matching capture transactions have SQL records that match exactly with corresponding SQL record in the replay transaction, as indicated in the exact match table, then the other potentially matching capture transactions can be eliminated from the table.

FIGS. 5A to 5D all include a column labeled "IDX" which represents the index number of records in the capture file and replay file. The column labeled "REP" represents a set of records in the replay file. The column labeled "CAP" represents a set of records in the capture file. Records in the capture and replay files include a transaction identifier, indicated in the Figures as a subscript numeral, but do not include an indication as to which statement of the transaction they are—that is, whether the record is, for example, the first, second, etc., record of the transaction. The exception to this is that an end-of-transaction record includes an indicator. In FIGS. 5A to 5D, end-of-transaction records are indicated by an appended subscript "c". To aid in understanding the operation of the algorithm, each Figure includes the list of transactions in the transaction workload in a column at the left of the Figure.

Window 500 represents the capture file match window. In this example, K equals 1, and the full match window size is 3. Several tables used by transaction matching program 142 are represented in FIGS. 5A to 5D. Two related tables associated with transactions in the capture file are indicated by their headings SQL→XACT, and XACT→SQL. These tables are used in the mapping of partial replay transactions to potential capture transactions, and, for a set of records of a transaction that have been read, to identify and flag as extraneous the rest of the records of the transaction when one record has been identified as extraneous.

Also associated with transactions in the capture file is the Committed Xacts buffer. This is a buffer of 2K+1 records, and is used to determine if a capture transaction for which the end-of-transaction SQL record has been read, indicating that transaction manager 122 has performed a "commit operation" for the transaction, finds a corresponding replay end-of-transaction SQL record within 2K+1 replay log file records. This buffer can be implemented as a circular buffer having a length of 2K+1, and may be implemented using the match window circular buffer.

Associated with transactions in the replay file is the R-XACT→C-XACT table, which is used by transaction matching program 142 to associate partial replay transaction to potential matching capture transactions. For example, two replay SQL records for a replay transaction have been read by transaction matching program 142, and the end-of-transaction SQL record for this transaction has not yet been read. Several records from the capture file have also been read from match window 500 relating to different transactions. There may be several capture transactions that include at least two SQL records corresponding to the order and the type of the two replay SQL records. These capture transactions would be included in the replay R-XACT→C-XACT table. When the end-of-transaction SQL record for a replay transaction is read, indicating that the final SQL record for this transaction has been read, this table is used by transaction matching program 142 to identify the remaining potential matching capture transactions for the replay transaction. Information to populate this table comes from entries in the capture file SQL→XACT and XACT→SQL tables, described above.

Additional tables used by transaction matching program 142 include the Transaction Matches table, which is used to record instances where a single capture transaction is identified as matching a replay transaction. The Exact SQL Matches table is used to identify exact matches between replay transactions and capture transactions.

The Declared XACT Match table is used to identify matches between recurring pairs of replay and capture transactions in which the match would be exact, except for the same recurring differences in their underlying SQL tokens. This would be the case if a capture SQL statement was changed by transaction processing system 120 prior to submission by transaction manager 122. As stated above, an assumption is made that if such a capture SQL statement was changed by transaction processing system 120 prior to submission by transaction manager 122, every occurrence of the statement will be changed in the same way. If such a partial transaction match occurs a certain number of times, an entry is recorded in the table that maps the partially matching capture SQL record to the matching replay SQL record. Entries in this table may be used by transaction matching program 142 to modify subsequent occurrences of the partially matching capture SQL record to exactly match the corresponding replay SQL record upon the partially matching capture SQL record's entry into the match window. This allows transaction matching program 142 to quickly declare the match without spending computing resources to arrive at the same decision.

FIGS. 5A to 5D illustrate an example in which a replay file and capture file are aligned at index 1. Each file includes SQL records associated with the following transaction sequence:

T1: $A_1 B_{1c}$ T2: $A_2 D_{2c}$ T3: $B_3 E_{3c}$ T4: $C_4 F_{4c}$ T5: $F_5 B_{5c}$

This transaction sequence repeats for transactions T6 through T10, although processing of all transactions is not illustrated. As illustrated, the underlying SQL statements of the transactions are interleaved in both the replay and capture files. In this example, K equals 1, and the full match window size is three capture records.

Figure 5A:
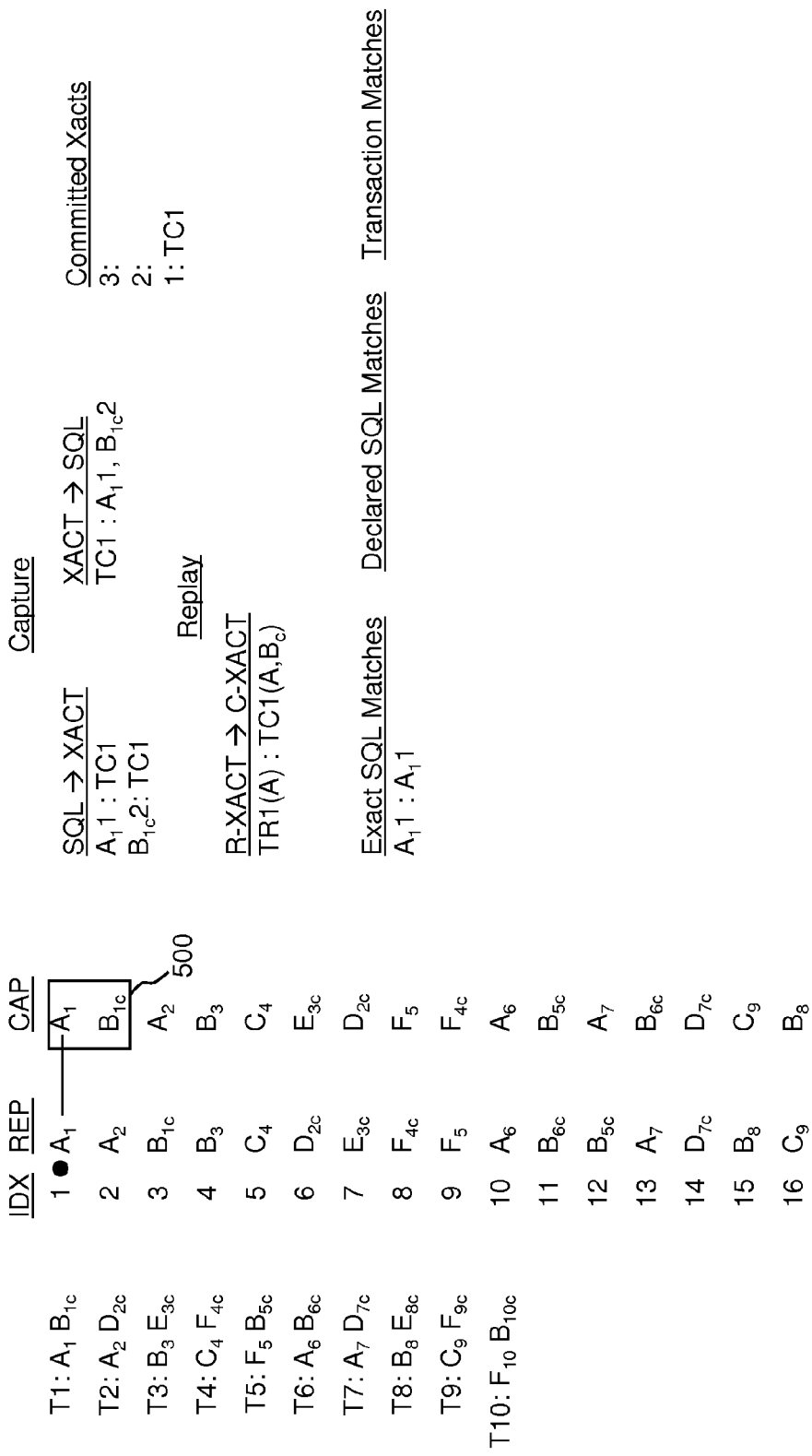
FIGS. 5A to 5D visually illustrate the operation of several successive iterations of the transaction matching program in FIG. 4, in accordance with an embodiment of the present invention.

FIG. 5A shows aspects of the transaction matching algorithm of FIG. 4 for a replay record 1. Match window 500 includes capture records 1 to 2. In this case, match window 500 is not the full three records because the algorithm is beginning with the first records in each file. For the first replay record, transaction matching program 142 "advances" to the "next" replay record, which is record 1, and match window 500 "advances" to include capture records 1-2 (step 400). Committed Xacts buffer, although shown with a transaction entry as the result of later processing, initially has no entries.

As the initial buffers and pointers are established, no unmatched or non-extraneous capture records are dropped from match window 500 (step 402, "no" branch), and no capture transactions are pushed from the Committed Xacts buffer (step 406, "no" branch). Capture records $A_1$ and $B_{1c}$ have entered the match window (because this is the first iteration of the algorithm). The associations between the records and the capture transactions to which they belong are recorded in capture tables SQL→XACT and XACT→SQL (step 410). In this case, both $A_1 1$ and $B_{1c} 2$ are associated with capture transaction 1 (TC 1). Because capture record $B_{1c}$ is an end-of-transaction record for TC1 (step 412, "yes" branch), capture transaction TC1 is recorded in position 1 of the Committed Xacts buffer (step 414).

Transaction matching program 142 then performs a comparison of replay record 1 to the unmatched and non-extraneous capture records in the match window (step 416). As stated previously, one of the assumptions is that although the order of the SQL records in the capture file may be different than the order of the corresponding SQL records in the replay file, a record in the replay file will find a match in the capture file, if there is a match, within a match window of 2K+1 records of the corresponding capture file index position. Thus, only records in the match window are compared to the current replay record to identify a match. Further, in the preferred embodiment of the invention, the other assumptions described above relating to SQL record matching apply with respect the operation of transaction matching program 142.

In this example, replay record $A_1$ at position 1 (replay $A_1$1) is an exact match to capture record $A_1$ at position 1 (capture $A_1$1). Because the match score between replay $A_1$1 and capture $A_1$1 is greater than the match score threshold (step 418, "yes" branch), indicating at least a partial match, an entry is added to replay table R-XACT→C-XACT (step 420). In this case, capture table SQL→XACT indicates that capture $A_1$1 is associated with capture transaction 1 (TC1), and an entry associating replay transaction 1 (TR1) to TC1 is added to replay table R-XACT→C-XACT. This entry indicates that, based on the capture and replay records read so far, partial transaction TR1 has a potential match to partial transaction TC1. Capture record $A_1$ at position 1 is also removed from match window 500 (step 422) so it will not be compared with subsequent replay records (see step 416), or flagged as extraneous (see step 404).

In this example, replay $A_1$1 is an exact match to capture $A_1$1 (step 424, "yes" branch), so an entry is added to the Exact SQL Matches table (step 426). Because the match is not less than the match score threshold (step 428, "no" branch), and the replay record is not an end-of-transaction record (step 432, "no" branch), processing returns to step 400.

Figure 5B:
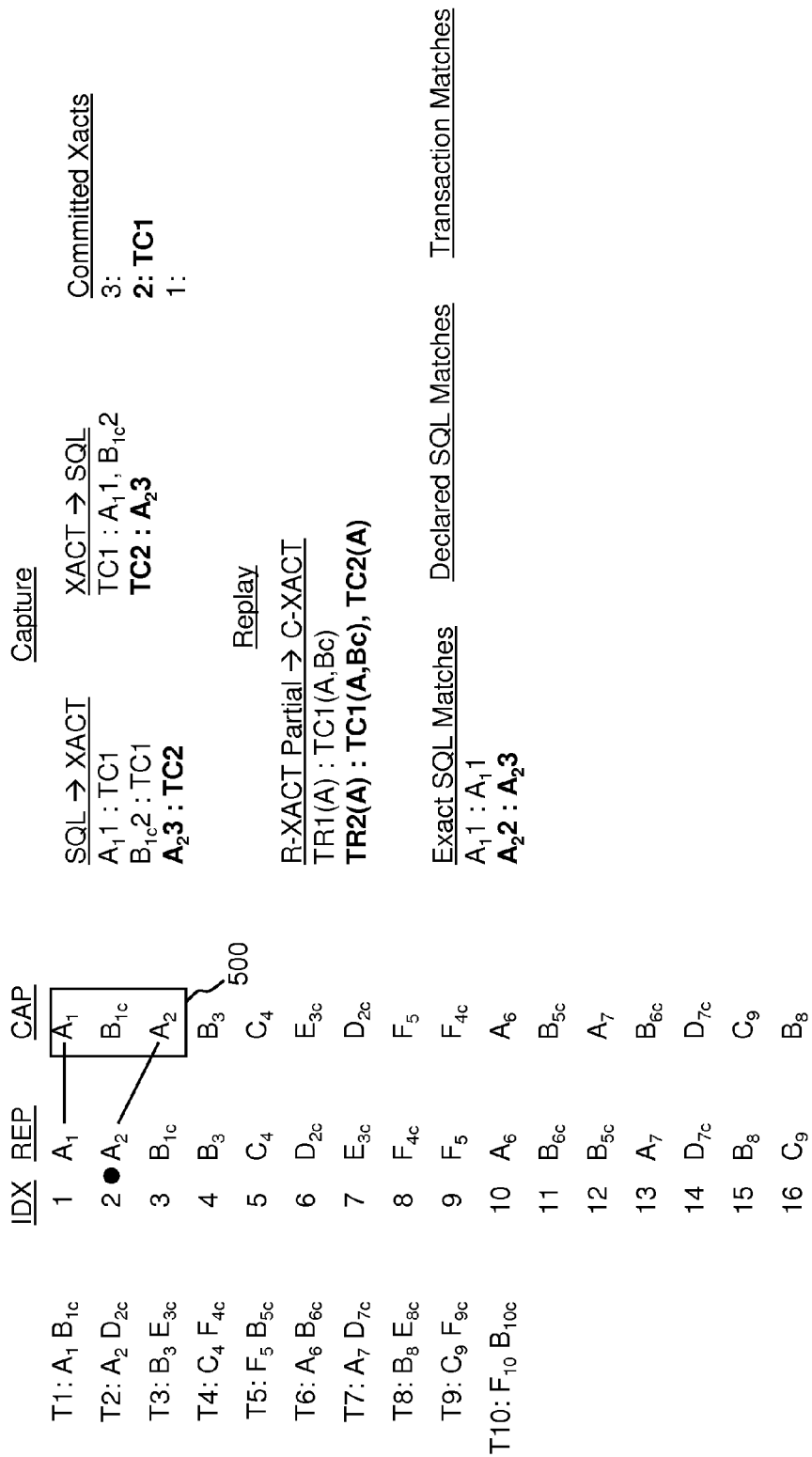

FIG. 5B shows aspects of the transaction matching algorithm of FIG. 4 for replay record 2. Transaction matching program 142 reads the next replay file record, in this case replay record $A_2$ at position 2 (step 400). Match window 500 advances to include capture record $A_2$ at position 3, and the Committed Xacts buffer advances such that the entry for TC1 now is in position 2. For ease of understanding, changes to the tables and buffers from the previous iteration of the algorithm depicted in FIG. 4 are highlighted in bold in FIGS. 5B to 5D. No unmatched or non-extraneous capture records are dropped from match window 500 (step 402, "no" branch), and no capture transactions are pushed from the Committed Xacts buffer (step 406, "no" branch). Capture record $A_2$ at position 3 is then recorded in the SQL→XACT and XACT→SQL capture tables (step 410). Capture record A2 at position 3 is not an end-of-transaction record (step 412, "no" branch).

Replay record $A_2$ at position 2 is then compared to the unmatched and non-extraneous capture records in match window 500 (step 416). In this case, the match between replay $A_2$2 and capture $A_2$3 has a match score greater than the match score threshold (step 418, "yes" branch). Replay table R-XACT→C-XACT is then updated to include an entry indicating the potential capture transactions that partial replay transaction T2 might match (step 420). In this case, as indicated in the SQL→XACT table, a record of non-end-of-transaction type "A" appears in capture transactions TC1 and TC2. Because not enough capture or replay record have been read to narrow the potential matches, the entry indicates that partial transaction TR2, of which only a record of type "A" has been read, has potential matches with capture transactions TC1 and TC2, both of which include a non-end-of-transaction type "A". Capture record $A_2$ at position 3 is also removed from match window 500 (step 422) so it will not be compared with subsequent replay records (see step 416), or flagged as extraneous (see step 404).

In this example, replay $A_2$2 is an exact match to capture $A_2$3 (step 424, "yes" branch), so an entry is added to the Exact SQL Matches table (step 426). Because the match is not less than the match score threshold (step 428, "no" branch), and the replay record is not an end-of-transaction record (step 432, "no" branch), processing returns to step 400.

Figure 5C:
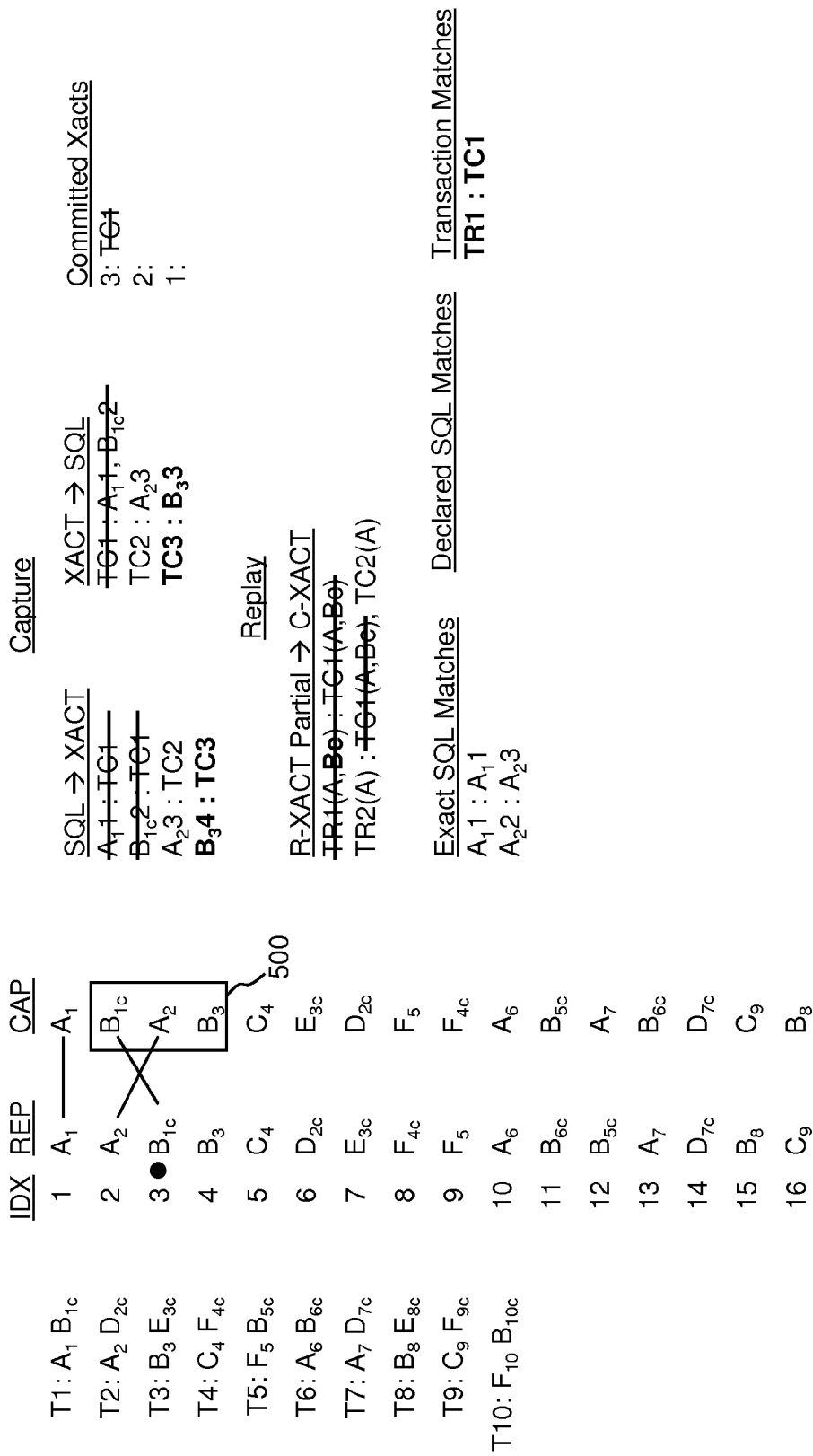

FIG. 5C shows aspects of the transaction matching algorithm of FIG. 4 for replay record 3. Transaction matching program 142 reads the next replay file record, in this case replay record $B_{1c}$ at position 3 (step 400). Match window 500 advances to include capture record $B_3$ at position 4, and the Committed Xacts buffer advances such that the entry for TC1 now is in position 3.

No unmatched or non-extraneous capture records are dropped from match window 500 (step 402, "no" branch). Although the position previously occupied by capture record $A_1$ at position 1 has been dropped from match window 500, record $A_1$1 was removed from window 500 because it was found to match a replay record with a match score greater than the match score threshold (see step 422). No capture transactions are pushed from the Committed Xacts buffer (step 406, "no" branch). Capture record $B_3$4 is recorded in the SQL→XACT and XACT→SQL capture tables (step 410). Capture $B_3$4 is not an end-of-transaction record (step 412, "no" branch).

Replay record $B_{1c}$ at position 3 is then compared to the unmatched and non-extraneous capture records in match window 500 (step 416). In this example, the match between replay $B_{1c}$3 and capture $B_{1c}$2 has a match score greater than the match score threshold (step 418, "yes" branch). Replay table R-XACT→C-XACT is updated to include information resulting from this match (step 420). In this case, the table already includes the potential match between TR1 and TC1, and the replay transaction TR1 is updated to include the just read replay $B_{1c}$3 record. Capture record $B_{1c}$3 is also removed from match window 500 (step 422). In this example, replay $B_{1c}$3 is not an exact match to capture $B_{1c}$2 (step 424, "no" branch), and the match score is not less than the match score threshold (step 428, "no" branch).

In certain embodiments, if the same non-exact but greater than match threshold match between a replay SQL record and a capture SQL record is found a certain number of times, an entry is added to the Declared SQL Matches table. As described above, the assumption is that this partial match is recurring because an otherwise exactly matching SQL statement has been changed, for example optimized, in one of the database environments that produced either the capture or replay log files, and every occurrence of the SQL statement has been changed in the same way. In these embodiments, each new capture record that is read is compared against entries in the Declared SQL Matches table. If a matching entry is found, the newly read capture record is changed to match the corresponding replay record.

Replay $B_{1c}$3 is an end-of-transaction record (step 432, "yes" branch). Transaction matching program 142, beginning with replay table R-XACT→C-XACT, then identifies the best match between the replay transaction for which the end-of-transaction record was just read, and the potential capture transaction matches to this replay transaction contained in the table (step 434). In this case, replay table R-XACT→C-XACT indicates that capture transaction TC1 is the only potential capture transaction match to replay transaction TR1. Thus, the TR1-to-TC 1 match is recorded in the Transactions Matches table, and references to TR1, TC1, and their underlying SQL records are removed from the capture and replay tables (step 436). This includes removing the TCI entry from the capture Committed Xacts table, so that during the next iteration of the algorithm, the entry is not pushed from the table, which would result in all references to TC1 being flagged as extraneous. In a preferred embodiment, if replay table R-XACT→C-XACT had indicated that more than one capture transaction was a potential match to replay transaction TR1, it would be determined if any of the SQL records of TR1 exactly matched any of the SQL records in any of the potentially matching capture transactions, based on the entries in the Exact SQL Matches table. If any exact matches were found, those potentially matching capture transactions without exactly matching SQL records would be removed from replay table R-XACT→C-XACT. If there were still more than one potentially matching capture transaction, then a best match would be determined by comparing replay transaction TR1 to each potentially matching capture transaction token by token, and declaring a match between TR1 and the potentially matching capture transaction whose match operation resulted in the highest match score. Processing then returns to step 400.

In this case, replay table R-XACT→C-XACT indicated only a single matching capture transaction for the replay transaction for which the end-of-transaction record had just been read (see step 434). It is possible that a replay transaction for which the end-of-transaction record has just been read has more than one potential matching capture transactions. For example, two complete capture transactions of the same transaction type are read, and the end-of-transaction record for a corresponding replay transaction is read. In this example, all three transactions are the same transaction type, and all three have had all their underlying SQL statement records read. Here, it may be possible to eliminate one or more of the potential matching transactions by taking the order of the underlying SQL records into account. As stated above, one of the assumptions is that the SQL records for a transaction will appear in a log file in the correct order, although SQL records from different transactions may be interleaved. Thus, comparing the ordered replay transaction to the potentially matching ordered capture transactions may eliminate one or more capture transactions having the same underlying SQL statements, but in a different order. If the potentially matching capture transactions in fact have underlying SQL transactions in the same order as the replay transaction, then the best match to the replay transaction may be identified by finding the candidate capture transaction having the highest sum of SQL record match scores.

Figure 5D:
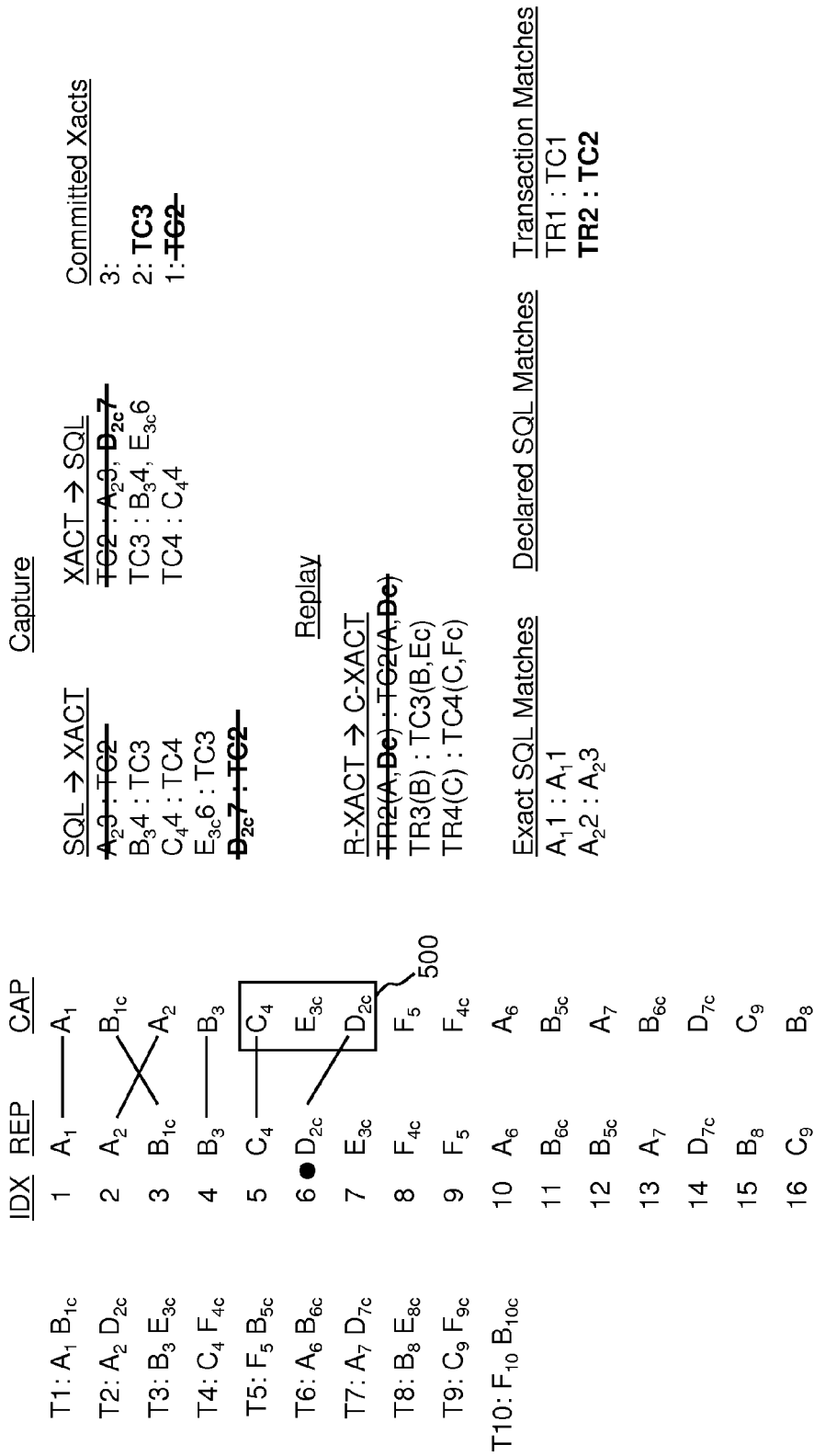

FIG. 5D shows aspects of the transaction matching algorithm of FIG. 4 for replay record 6. Transaction matching program 142 reads the next replay file record, in this case replay record $D_{2c}$ at position 6 (step 400). Match window 500 advances to include capture record $D_{2c}$ at position 7. The Committed Xacts buffer advances such that the entry for TC3—which was added to the buffer because end-of-transaction record $E_{3c}$ for capture transaction TC3 was read for the processing of replay record 5—is now in position 2.

Similar to the previous iterations of the algorithm, no unmatched or non-extraneous capture records are dropped from match window 500 (step 402, "no" branch) and no capture transactions are pushed from the Committed Xacts buffer (step 406, "no" branch). Capture record $D_{2c}7$ is recorded in the SQL→XACT and XACT→SQL capture tables (step 410). Capture $D_{2c}7$ is an end-of-transaction record (step 412, "yes" branch), and an entry for capture transaction TC2 is added to capture table Committed Xacts at position 1.

Replay record $D_{2c}6$ is then compared to the unmatched and non-extraneous capture records in match window 500 (step 416). In this example, the match between replay $D_{2c}6$ and capture $D_{2c}7$ has a match score greater than the match score threshold (step 418, "yes" branch). Replay table R-XACT→C-XACT is updated to include information resulting from this match (step 420). In this case, the table already includes the potential match between TR2 and TC2, and the transactions are updated to include the just read replay $D_{2c}6$ and capture $D_{2c}7$ records. Capture record $D_{2c}7$ is also removed from match window 500 (step 422). In this example, replay $D_{2c}6$ is not an exact match to capture $D_{2c}7$ (step 424, "no" branch), and the match score is not less than the match score threshold (step 428, "no" branch).

Replay $D_{2c}6$ is an end-of-transaction record (step 432, "yes" branch). Transaction matching program 142, beginning with replay table R-XACT→C-XACT, then identifies the best match between the replay transaction for which the end-of-transaction record was just read, and the potential capture transaction matches to this replay transaction contained in the table (step 434). In this case, replay table R-XACT→C-XACT indicates that capture transaction TC2 is the only potential capture transaction match to replay transaction TR2. Thus, the TR2-to-TC 2 match is recorded in the Transactions Matches table, and references to TR2, TC2, and their underlying SQL records are removed from the capture and replay tables (step 436). Processing then returns to step 400.

The rest of the replay and capture SQL records would be processed in a similar fashion, ultimately identifying all matching transactions. As mentioned above, information relating to the matching transactions can then be used by benchmark analysis system 140 to compare execution statistics of the two runs of the benchmark transaction workload.

The simplified example of FIGS. 5A to 5D does not include extraneous transactions. Extraneous transactions would be processed in the following manner. A replay SQL record is considered extraneous if a capture record in match window 500 is not matched with a match score greater than the match score threshold (see step 428, "yes" branch). When this occurs, the entire transaction to which the extraneous replay record belongs is considered extraneous. Thus, if an entry exists in the replay R-XAXT→C-XACT table exists, it is removed (see step 430).

A capture SQL record is considered extraneous, generally, when the capture SQL record is not matched to a replay SQL record while the capture SQL record is within a certain number of records of the capture record having the same index as the replay record currently being processed. This is more easily understood in terms of match window 500, and the Committed Xacts capture table, described above. A first way that a capture SQL record is considered extraneous is when it is dropped from match window 500 before it is matched to a replay record (see step 402, "yes" branch). In this case, all entries in the capture tables SQL XACT and XACT→SQL that include the dropped capture record are removed. Entries in the replay table R-XACT→C-XACT that reference the capture transaction of which the dropped capture SQL record belongs are also removed (see step 404). In this manner, all references to the capture transaction of which the dropped capture SQL record belongs are removed from the tables.

A second way in which a capture transaction can be considered as extraneous is when the capture transaction is pushed from the capture Committed Xacts buffer (see step 406, "yes" branch). This occurs when an end-of-transaction capture SQL record is not matched to a corresponding replay end-of-transaction capture SQL record within 2K+1 replay records, which is the depth of the Committed Xacts buffer. Similar to the two ways described just above, when a capture transaction entry is dropped from the Committed Xacts buffer, references to the capture transaction are removed from the capture tables SQL→XACT and XACT→SQL, and from the replay table R-XACT→C-XACT (see step 408).

FIG. 6 shows a block diagram of the components of a data processing system 800, 900, such as user computing device 110, in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User computing device 110 includes internal components 800 and external components 900 illustrated in FIG. 6. Internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 122, 124, and 142 in user computing device 110 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. The programs 122, 124, and 142 in user computing device 110 can be stored on one or more of the respective portable computer-readable tangible storage devices 936, read via the respective R/W drive or interface 832 and loaded into the respective hard drive 830.

Internal components 800 also include network adapters or interfaces 836 such as a TCP/IP adapter cards, wireless wi-fi interface cards, or 3G or 4G wireless interface cards or other wired or wireless communication links. The programs 122, 124, and 142 in user computing device 110 can be downloaded to user computing device 110 from an external computer via a network (for example, the Internet, a local area network or other, wide area network) and network adapters or interfaces 836. From the network adapters or interfaces 836, the programs 122, 124, and 142 in user computing device 110 are loaded into hard drive 830. The network may comprise copper wires, optical fibers, wireless transmission, routers, firewalls, switches, gateway computers and/or edge servers.

External components 900 can include a computer display monitor 920, a keyboard 930, and a computer mouse 934. External components 900 can also include touch screens, virtual keyboards, touch pads, pointing devices, and other human interface devices. Internal components 800 also include device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method for identifying matching transactions between two log files, each transaction including one or more programming statements, each programming statement including one or more tokens and an indicator indicating if the programming statement is the end-of-transaction programming statement of the transaction, each log file containing records recording the execution on a computer of the programming statements, each record including a transaction identifier, the tokens, and the end-of-transaction indicator indicating if the record is the end-of-transaction record of the transaction of the corresponding executed programming statement, the method comprising the steps of:

- in response to determining that a least recently read record of a fixed number of sequentially read records from a first log file is not associated with an indication of match, removing references to the transaction identifier and the programming statement associated with the least recently read record from a first table that includes associations of programming statements to the transaction identifiers to which they are associated, and associations of transaction identifiers to their associated programming statements;
- in response to determining that the least recently read record is an end-of-transaction record, removing references to the transaction identifier associated with the record from the first table;
- reading a next sequential record from the first log file into the fixed number of sequentially read records;
- adding information to the first table, based on the transaction identifier and the programming statement information contained in the next sequential record read from the first log file, associating the programming statement to the transaction identifier, and associating the transaction identifier to the programming statement;
- reading from a second log file the record at a position in the second log file a defined fixed offset of records away from the position in the second log file corresponding to the position in the first log file of the next sequential record read from the first log file;
- determining if the record read from the second log file matches a record in the fixed number of sequentially read records;
- in response to determining that the record read from the second log file matches a record in the fixed number of sequentially read records, associating the matched record in the fixed number of sequentially read records with an indication of match, and adding information to a second table that contains associations of transaction identifiers contained in records read from the second log file to transaction identifiers contained in records read from the first log file, based on information contained in the first table;
- in response to determining that the record read from the second log file does not match a record in the fixed number of sequentially read records, removing references to the transaction identifier contained in the record read from the second log file from the second table; and
- in response to determining that the record read from the second log file matches a record in the fixed number of sequentially read records and that the record read from the second log file is an end-of-transaction record, associating the matched record in the fixed number of sequentially read records with an indication of match, and identifying a transaction from the first log file that matches a transaction from the second log file based on information contained in the second table.

2. A method in accordance with claim 1, wherein the step of determining if the record read from the second log file matches a record in the fixed number of sequentially read records comprises comparing the tokens in the record read from the second log file to the corresponding tokens of a record in the fixed number of sequentially read records, based on token types and token values, and determining that a match exists between the record read from the second log file and the record in the fixed number of sequentially read records if the number of corresponding tokens that match is above a defined match threshold.

3. A method in accordance with claim 2, further comprising the steps of:

- in response to determining that the tokens in the record read from the second log file match all the corresponding tokens in a record in the fixed number of sequentially read records, adding information to a third table associating the record read from the second log file to the record in the fixed number of sequentially read records with the matching corresponding tokens; and
- in response to determining that the tokens in the record read from the second log file match all the corresponding tokens in a record in the fixed number of sequentially read records, and that the record read from the second log file is an end-of-transaction record, identifying a transaction from the first log file that matches a transaction from the second log file based on information contained in the second table and the third table.

4. A method in accordance to claim 2, further comprising the steps of:

- in response to determining that a defined number of matches have occurred between records in the fixed number of sequentially read records, having a first specific arrangement of tokens having specific token types and token values, and records read from the second log file, having a second specific arrangement of tokens having specific token types and token values, not all corresponding tokens matching but the number of corresponding tokens that match being above the defined match threshold, adding information to a fourth table associating a record in the fixed number of sequentially read records having the first specific arrangement of tokens to a record from the second log file having the second specific arrangement of tokens; and
- in response to determining that the next sequential record read from the first log file into the fixed number of sequentially read records has tokens having the first specific arrangement of tokens, setting the tokens to have the second specific arrangement of tokens.

5. A method in accordance with claim 1, wherein the records read from the first log file into the fixed number of sequentially read records are read into a circular buffer having a length equal to the fixed number.

6. A method in accordance with claim 5, wherein the indication of match includes removing the matched record in the fixed number of sequentially read records from the circular buffer.

* * * * *

UNITED STATES PATENT AND TRADEMARK OFFICE
CERTIFICATE OF CORRECTION

| | | |
|---|---|---|
| PATENT NO. | : 8,788,473 B2 | Page 1 of 1 |
| APPLICATION NO. | : 13/906374 | |
| DATED | : July 22, 2014 | |
| INVENTOR(S) | : Manoj K. Agarwal et al. | |

It is certified that error appears in the above-identified patent and that said Letters Patent is hereby corrected as shown below:

On the title page item (72), line 4, inventor name "Rajesh Samabandhan" should read --Rajesh Sambandhan--.

Signed and Sealed this
Eighteenth Day of November, 2014

Michelle K. Lee
*Deputy Director of the United States Patent and Trademark Office*